United States Patent [19]

Wey et al.

[11] 4,436,295
[45] Mar. 13, 1984

[54] VACUUM CHUCK FOR HOLDING FILAMENTS

[75] Inventors: Robert A. Wey, Plainville; Harold A. Roberts, North Attleboro, both of Mass.

[73] Assignee: Augat Inc., Mansfield, Mass.

[21] Appl. No.: 273,072

[22] Filed: Jun. 12, 1981

[51] Int. Cl.³ .............................................. B25B 11/00
[52] U.S. Cl. ...................................... 269/21; 269/909
[58] Field of Search ..................... 248/362, 363; 279/3; 51/235; 294/64 R, 64 A, 64 B, 65; 269/21, 76, 82, 909

[56] References Cited

U.S. PATENT DOCUMENTS

| | | |
|---|---|---|
| 3,431,009 | 3/1969 | Mammel . |
| 3,568,375 | 3/1971 | Carroll ..................................... 279/3 |
| 3,572,736 | 3/1971 | Lynch et al. . |
| 3,627,299 | 12/1971 | Schwarze . |
| 3,747,282 | 7/1973 | Katzke . |
| 4,040,476 | 8/1977 | Telle et al. ...................... 285/137 R |
| 4,058,246 | 11/1977 | Nicklaus . |
| 4,096,010 | 6/1978 | Parham et al. ......................... 269/21 |
| 4,174,847 | 11/1979 | Wiesler . |

FOREIGN PATENT DOCUMENTS 2074748 11/1981 United Kingdom .................. 269/21

Primary Examiner—Robert C. Watson
Attorney, Agent, or Firm—Weingarten, Schurgin, Gagnebin & Hayes

[57] ABSTRACT

A vacuum chuck particularly suited for use with optical fibers includes a V-shaped channel provided with "hold-down" suction and extending across the middle of a plane surface for placement of an optical fiber. The V-shaped channel is formed by abutting chamfered edges of two metal, solid rectangular jaw blocks. Slots along the abutting sides of the jaw blocks extend away from the chamfered edges to form passages for applying suction to the V-shaped channel for retention of the fiber therein. The passages are centered in the channel and the suction drawn through them pulls the fiber directly down into the V-shaped channel for precise centering therein. The top surfaces of the jaw blocks form a plane surface which extends laterally onto the shoulder of a support base. The generally planar surface facilitates placement and visual confirmation of the alignment of the fiber thereon and further permits mechanical securing of the fiber by tape or other means so that suction is not continuously required. Set screws are provided for securing the jaw blocks to the base. The center lines of the set screw holes are offset slightly below the centers of detent holes in the jaw blocks when assembled on the base and the detent holes are provided with sloping walls so that as the set screws are tightened into the blocks, they are drawn downwardly and driven together to effect a seal around the vacuum ports without a separate gasket. The jaw blocks may be easily removed by withdrawal of the set screws for cleaning of the passage slots to prevent clogging of the vacuum ports, and they may be easily replaced in proper alignment.

10 Claims, 4 Drawing Figures

VACUUM CHUCK FOR HOLDING FILAMENTS

FIELD OF THE INVENTION

This invention relates generally to vacuum chucks and more particularly to vacuum chucks for precisely locating and holding optical fibers.

BACKGROUND OF THE INVENTION

Vacuum chucks are used for locating and holding various objects in a desired alignment for various assembly or manufacturing tasks. Such vacuum chucks have been used to hold and position semiconductor wafers, as shown in U.S. Pat. No. 4,037,830, optical lenses, as shown in U.S. Pat. Nos. 4,079,976 and 4,184,292, and larger articles, such as shown in U.S. Pat. No. 4,110,937.

One particularly important use for vacuum chucks is in the handling of optical fibers. A previously known vacuum chuck for this use is formed as a right angle step between metal plates of different heights. The fiber is held in place at the bottom of the groove formed by the step by suction which is applied from one side of the top along ports in one plate or the other. These vacuum ports may be formed either by machining grooves into a side of the short plate, or by spacing the plates one from the other by means of a shim. In either event, the vacuum ports are inherently non-symmetrical, thus limiting the width of the vacuum port to one-half the diameter of the fiber for which it is to be used. In order to provide a vacuum sufficient to hold the fiber in place, the vacuum port must be made relatively long to compensate for its narrow width. In addition, because of the narrow width of the port, it is easily blocked by dust, and the port can only be cleaned by taking the plates apart and reassembling them. Reassembly is often time-consuming and difficult because of the necessity for proper alignment of the two plates and shim to avoid leakage. Because of the step formed of the plates, the fiber is not easily visible to a person performing operations thereon for visual confirmation of alignment. Also because the vacuum ports extend parallel to the surface of one plate, the fiber is not shown directly down into the groove formed by the step and it is difficult to properly position therein.

SUMMARY OF THE INVENTION

In accordance with the present invention a vacuum chuck, particularly suited for locating and holding optical fibers, includes two jaw blocks having chamfered edges. The jaw blocks are butted together to form a plane top surface and the chamfered edges are mated forming a V-shaped channel in which the optical fiber is placed. The jaw blocks are provided with opposed machined slots on a portion of the abutting sides thereof which mate to form vacuum ports leading directly away from the bottom of the V-shaped channel to open on the opposite or bottom surfaces of the blocks. The vacuum ports communicate with a conduit in a base which cradles the jaw blocks in their abutting relationship. The conduit is connected to a vacuum source.

The top surfaces of the jaw blocks are flush with the tops of base side arms and together form a generally planar surface. The jaw blocks are locked firmly into place in the base by set screws which have rounded ends and which pass through side walls of the base. The centers of the set screws are offset below the centers of corresponding cone-shaped detent holes in the blocks into which they extend so that as the screws are tightened, the jaws are drawn downwardly against the base and driven laterally against one another so that the vacuum ports are sealed.

Because the vacuum ports are formed symmetrically between the two jaw blocks of the chuck, the width of the vacuum ports may be greater than one-half the diameter of the optical fiber, and therefore, their length need not be as great as that required for the prior art chucks. In addition, because the vacuum ports are centered between the jaw block, the fiber is drawn downwardly directly into the V-shaped channel, thereby providing repeatable accuracy of fiber placement. The planar top surfaces permit visual confirmation of the accuracy of fiber placement and allows the use of mechanical means such as tape, a clamp or a weight to retain the fiber in the V-shaped channel after initial placement with the vacuum activated. Since the chuck jaw blocks are easily removed by withdrawal of the set screws, the vacuum ports may be cleaned if clogged, and the jaws may be replaced and precisely aligned with a minimum of time and effort. Additionally, the greater width of the vacuum ports as compared with the prior art increases the holding force of the chuck and reduces the chance of clogging of the ports. The use of mutiple ports renders the chuck effective even if one of the ports becomes clogged or if the seal of one of the ports is broken. This arrangement permits fairly relaxed tolerances for the base and other elements of the chuck and requires only that the chuck jaw blocks be precisely machined.

DESCRIPTION OF THE DRAWING

The objects, advantages and features of this invention will be more clearly appreciated from the following solely exemplary detailed description taken in conjunction with the accompanying drawing in which.

DETAILED DESCRIPTION OF THE PREFERRED EMBODIMENT

Figure 1:
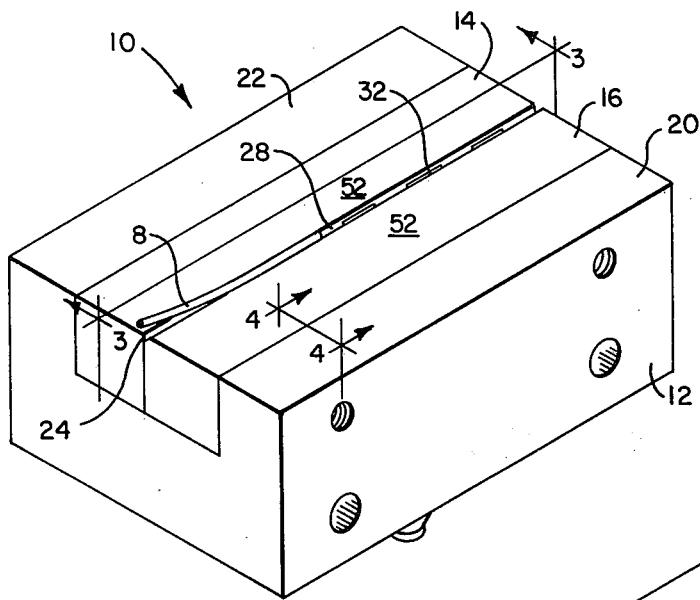
FIG. 1 is a pictorial representation of the assembled vacuum chuck of this invention.
Figure 2:
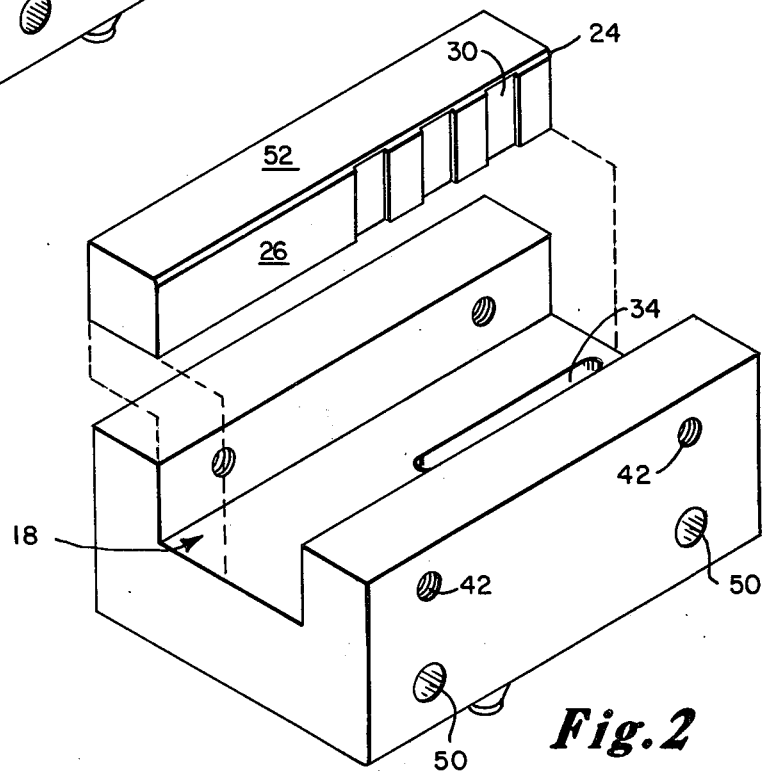
FIG. 2 is an exploded view of a portion of the vacuum chuck of FIG. 1.

With reference to the drawing and more particularly to FIGS. 1 and 2 thereof, there is shown a pictorial representation of a vacuum chuck 10 according to this invention. Vacuum chuck 10 for holding a fiber 8 includes a base 12 and two jaw blocks 14 and 16 cradled within a cavity 18 formed between upstanding walls 20 and 22 of base 12, the cavity 18 having a width equal to the combined widths of jaw blocks 14 and 16. Each jaw block 14 and 16 has an upwardly and inwardly facing edge 24 which is chamfered, typically at an angle of 45°. When jaw blocks 14 and 16 are placed together within cavity 18 so that inwardly facing lateral walls 26 thereof are abutting, edges 24 of each jaw block 14 and 16 are facing each other and together form a generally V-shaped channel 28 adapted to receive an optical fiber.

Figure 3:
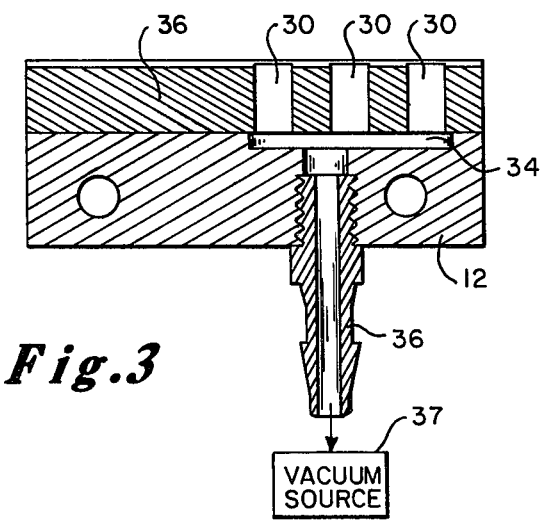
FIG. 3 is a cross-sectional view of the vacuum chuck of this invention taken along the line 3—3 of FIG. 1.

As is more clearly shown in FIG. 2, a plurality of slots 30 are formed in lateral wall 26 of each jaw block 14 and 16 and extend from edges 24. The slots 30 in jaw block 14 are in mating relationship with the slots 30 in jaw block 16 when walls 26 of the jaw blocks are in abutting relation within base 12. Thus, slots 30 of jaw blocks 14 and 16 together form vacuum ports 32 for applying suction to an optical fiber within channel 28. The upper portion of ports 32 extend to channel 28, while the lower portion thereof is in communication with a port 34 in base 12 which in turn is connected to a source of vacuum through a conduit 36 which passes through the bottom of base 12 to a vacuum source 37, as shown in FIG. 3. At least one and typically, three ports 32 are provided, although other numbers may be provided depending upon the particular application. The ports may extend along the entire length of channel 28 or not as desired for the use, taking into account the fiber routing to the chuck. A plurality of discrete ports 32 are preferred to one long port so that if one the ports becomes clogged or if the vacuum seal is broken around one of the ports, the other ports will still be effective to hold the optical fiber in place. Another advantage of multiple ports is that fibers smaller in diameter than the port width may still be held in the chuck without being pulled into the port.

Figure 4:
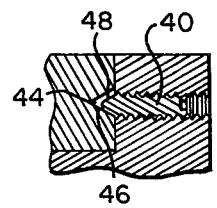
FIG. 4 is a partial cross-sectional view of the vacuum chuck of this invention taken along the line 4—4 of FIG. 1.

Jaw blocks 14 and 16 are preferably retained within cavity 18 by set screws 40, which are more clearly shown in FIG. 4. Typically, two screws 40 are provided for each jaw block 14 and 16, and screws 40 pass through associated threaded holes 42 in walls 22 and 20 respectively of base 12 into mating holes in jaw block 14 and 16 respectively. Tips 48 of screws 40 are hemispherical and the two mating holes 44 are offset slightly above the center of corresponding hole 42, as shown in FIG. 4. The entire hole 44 is provided with a cone shape. As each screw 40 is advanced through its associated hole 42 toward corresponding hole 44, tip 48 thereof rides upwardly along surface 48 of hole 44 driving its associated jaw block down and in toward the other jaw block. When all screws 40 are inserted, jaw block 14 and 16 are driven tightly together to effect a tight vacuum seal around ports 32 without gasketing. Jaw blocks 14 and 16 are also driven down to affect a tight vacuum seal between ports 32 and port 34.

Should ports 32 or port 34 become clogged, they may be cleaned by release of set screws 40 and to allow removal of jaw blocks 14 and 16. Once jaw blocks 14 and 16 are separated, cleaning of ports 32 is facilitated, because the ports are separated into two slots 30 to which there is easy access. Reassembly may be accomplished by replacement of jaw blocks 14 and 16 in cavity 18 and by insertion of set screws 40 which quickly reestablish the desired alignment of jaw blocks 14 and 16 within cavity 18. Thus, the chuck may be disassembled, cleaned and reassembled with great ease and speed while still achieving the necessary precise location of V-shaped channel and the optical fiber it is adapted to hold. Means other than screws 40 may be used to secure jaw block 14 and 16 to base 12, although the screws are preferred. One alternative example is a spring-biased ball protruding from holes in walls 22 and 20 of base 12 which would provide the necessary alignment and allow jaw blocks 14 and 16 to be snapped into place.

Base 12 may be provided with a pair of mounting holes 50 which pass through base 12 beneath cavity 18. Holes 50 are utilized to mount base 12 as a part of an assembly used in the performance of operations upon optical fibers within V-shaped channel 28.

Because slots 30 each have the same depth within walls 26, the ports 32 formed by the joinder of opposing slots 30 are symmetrical with respect to channel 28 and to jaw blocks 14 and 16. As a result, the width of the vacuum ports 32 may be greater than one-half the diameter of the optical fiber to be placed within channel 28, and the length of each port 32 need not be as great as that required in prior art vacuum chucks. Therefore, a plurality of such ports 32 may be provided along channel 28, so that should the vacuum seal around any of the ports be broken, the other ports would still be effective to retain the optical fiber in place. The greater width of the vacuum ports as compared with the prior art also increases the holding force of the chuck and reduces the chance of clogging of the ports. Additionally, because the ports are symmetric with respect to channel 28, and because the ports extend downwardly from the vertex of channel 28 generally perpendicular with respect to upper surfaces 52 of jaw blocks 14 and 16, the optical fibers are drawn directly down and are more securely held in a centered position within channel 28.

Typically, upper surface 52 of each of the jaw blocks is level with upper surface 52 of the other jaw block, and typically both upper surfaces 52 are level with the upper surfaces of walls 20 and 22. A generally planar work surface is thus formed by upper surfaces 52 and the upper surfaces of walls 20 and 22. As a consequence, an optical fiber disposed within channel 28 is clearly visible to permit verification of correct alignment and more fully accessible to anyone performing operations thereon. There are no interfering surfaces or walls. This feature also permits more complex operations to be performed far more easily and with greater precision than permitted in prior art vacuum chucks. The planar surface additionally permits a mechanical securing device such as tape, a clamp, or a weight to be used to hold the fiber in place after initial vacuum chucking, thereby avoiding the need for continuous operation of the vacuum source.

It is important that edges 24 of chucks 14 and 16 be precisely configured to provide the proper dimension and symmetry to channel 28. In addition, it is important that slots 30 and walls 26 be precisely formed to provide the necessary symmetry and to insure a proper vacuum seal. However, the tolerances required in the dimensioning and formation of the other elements of the vacuum chuck are not as strict. As a result, only jaw blocks 14 and 16 require close tolerances, and since these elements are separable from the other portions of the jaw and may be produced independently thereof, the cost and time necessary to produce the chuck is reduced.

The dimensions of the V-shaped channel 28 and of ports 32 are a function of the fiber diameter in view of the considerations noted above. The base 12 is typically dimensioned in accordance with the fixture assembly in which it is to be used; a large base as shown having the advantage of permitting the ultimate user to provide alternative mounting holes 50.

The above description is exemplary only, and modifications and improvements are intended to fall within the scope of this invention as defined solely in the following claims:

What is claimed is:

1. A vacuum chuck comprising:
    first and second blocks each having adjacent top and side surfaces set at substantially right angles to each other and having chamfered edges between said surfaces;
    means for holding said first and second blocks with the side surfaces thereof in butting relationship and with said top surfaces having a V-shaped channel running thereacross formed by the chamfered edges;

the butted side surfaces of said first and second blocks having one or more matching slots forming one or more passages communicating with the V-shaped channel; and means adapted for connecting a source of vacuum to said one or more passages;

wherein said holding means includes:

a cradle having a bottom and a pair of upwardly extending arms passing adjacent to sides of said first and second blocks opposite the abutting side surfaces; and means for securing said first and second blocks to said cradle from said arms and for pressing said butting side surfaces together.

2. The vacuum chuck of claim 1 wherein said securing means includes means for pressing said blocks down onto said cradle bottom.

3. The vacuum chuck of claim 2 wherein said securing means includes pins adapted to be urged into concave recesses in said first and second blocks through apertures in said cradle arms with the pins having convex end surfaces engaging said concave recesses which recesses are set off-line in the direction toward the top surfaces of said blocks whereby urging said pins into said blocks forces said blocks down and together, applying pressure to the butting side surfaces and between said blocks and said cradle bottom.

4. The vacuum chuck of claims 2 or 3 wherein:

said slots extend across said butting side surfaces whereby said passage communicate between said V-shaped channel at the top surfaces of the blocks and the opposite surfaces thereof.

5. The vacuum chuck of claims 1, 2, or 3 wherein:

said slots extend across said butting side surfaces whereby said passage communicate between said V-shaped channel at the top surfaces of said blocks and the opposite surfaces thereof;

said means adapted for connecting a source of vacuum includes a manifold in the bottom of said cradle communicating with said passages.

6. The vacuum chuck of claim 3 wherein said convex end is hemispherical, and said concave recesses are conical.

7. A vacuum chuck comprising:

first and second rigid blocks each having adjacent top and side surfaces set at substantially right angles to each other and having chamfered edges between said surfaces;

means for holding said first and second rigid blocks with the side surfaces thereof in butting relationship and with said top surfaces having a V-shaped channel running thereacross formed by the chamfered edges;

the butted side surfaces of said first and second blocks having one or more matching slots forming one or more passages communicating with and transverse to the V-shaped channel; and means adated for connecting a source of vacuum to said one or more passages;

said holding means including means for holding said butting side surfaces together to form said one or more passages.

8. The vacuum chuck of claim 1 wherein said top surfaces as held with said side surfaces in butting relationship define a single, planar top surface.

9. A vacuum chuck for holding fibers comprising:

a base;

a first jaw disposed on said base and having an upwardly and inwardly facing first chamfered edge and at least one first slot formed on an inwardly facing first sidewall, and first slot generally transversely extending to said first chamfered edge;

a second jaw disposed on said base and having a sidewall in abutting relationship with said sidewall of said first jaw, said second jaw having an upwardly and inwardly facing second chamfered edge mating with said first chamfered edge to form a channel for placement of said fiber, said second sidewall having at least one second slot formed therein in opposed mating relationship with said first slot and generally tranversely extending to said second chamfered edge, said first slot and said second slot together forming at least one sealed port communicating with said channel;

means for securing said first jaw and said second jaw to said base and to maintain said first and second sidewalls in mated contact to form said channel for placement of said fiber and to form said at least one sealed port communicating with said channel; and means connecting said port to a source of vacuum.

10. The vacuum chuck of claim 9 further comprising means for removably securing said first jaw and said second jaw to said base.

* * * * *